US009906724B2

(12) United States Patent
Nilsson et al.

(10) Patent No.: US 9,906,724 B2
(45) Date of Patent: Feb. 27, 2018

(54) METHOD AND DEVICE FOR SETTING A FOCUS OF A CAMERA (71) Applicant: AXIS AB, Lund (SE)

(72) Inventors: Dennis Nilsson, Malmo (SE); Johan Nystrom, Vellinge (SE); Bjorn Benderius, Stehag (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/251,271

(22) Filed: Aug. 30, 2016

(65) Prior Publication Data
US 2017/0070677 A1 Mar. 9, 2017

(30) Foreign Application Priority Data

Sep. 7, 2015 (EP) .................................. 15184086

(51) Int. Cl.
*H04N 5/232* (2006.01)
(52) U.S. Cl.
CPC ....... *H04N 5/23254* (2013.01); *H04N 5/2329* (2013.01); *H04N 5/23212* (2013.01); *H04N 5/23258* (2013.01); *H04N 5/23296* (2013.01)
(58) Field of Classification Search
CPC ........... H04N 5/23212; H04N 5/23254; H04N 5/23251; H04N 5/23229; H04N 5/23258; H04N 5/23296
USPC ... 348/208.4, 208.99, 208.1, 208.12, 208.13, 348/345, 349, 352, 353, 356; 396/77, 396/121, 122, 153
See application file for complete search history.

(56) References Cited

U.S. PATENT DOCUMENTS

| 8,274,596 B2 | 9/2012 | Pincenti et al. |
| 8,610,796 B2* | 12/2013 | Kindaichi .......... H04N 5/23212 348/220.1 |
| 2006/0238632 A1* | 10/2006 | Shah .................... H04N 5/3532 348/296 |
| 2007/0122129 A1 | 5/2007 | Sakamoto et al. |
| 2009/0160957 A1* | 6/2009 | Deng ................. H04N 5/23248 348/208.99 |

(Continued)

FOREIGN PATENT DOCUMENTS

| JP | 6-153053 | 5/1994 |
| JP | 2010-271499 A | 12/2010 |

(Continued)

OTHER PUBLICATIONS

European Search Report (with Written Opinion) dated Feb. 19, 2016 in European Application 15184086.5 filed on Sep. 7, 2015.

(Continued)

*Primary Examiner* — Nhan T Tran
*Assistant Examiner* — Marly Camargo
(74) *Attorney, Agent, or Firm* — Oblon, McClelland, Maier & Neustadt, L.L.P.

(57) ABSTRACT

The present invention relates generally to auto focus algorithms for setting a focus of a camera. More specifically, the present invention relates to a method (600) and device for setting a focus of a camera wherein a camera motion level of the camera is continuously measured (S604) during the read-out of pixel data by a rolling shutter image sensor and wherein the auto focus algorithm uses weighted focus measures which are calculated (S612) using the continuously measured camera motion levels.

15 Claims, 4 Drawing Sheets (56) References Cited

U.S. PATENT DOCUMENTS

| | | | |
|---|---|---|---|
| 2010/0039542 A1* | 2/2010 | Shah | H04N 5/3532 |
| | | | 348/296 |
| 2012/0057034 A1 | 3/2012 | Tanaka | |
| 2013/0021516 A1 | 1/2013 | Kikuchi | |
| 2013/0033623 A1 | 2/2013 | Matsuyama | |
| 2013/0044241 A1 | 2/2013 | Zhou | |
| 2014/0184833 A1 | 7/2014 | Lee et al. | |
| 2014/0368725 A1 | 12/2014 | Brunner et al. | |

FOREIGN PATENT DOCUMENTS

| | | |
|---|---|---|
| JP | 2014-77976 | 5/2014 |
| JP | 2014-139675 | 7/2014 |
| JP | 2014-139679 A | 7/2014 |

OTHER PUBLICATIONS

Office Action dated Oct. 26, 2017 in Japanese Patent Application No. 2016-170550 (with computer generated English translation).
Allowance of Patent dated Oct. 12, 2017 in Korean Application No. 10-2016-0112650 (with English translation).

* cited by examiner

METHOD AND DEVICE FOR SETTING A FOCUS OF A CAMERA

TECHNICAL FIELD

The present invention relates generally to auto focus algorithms for setting a focus of a camera.

BACKGROUND OF THE INVENTION

Image capture devices, such as digital cameras and other similar mechanisms, are becoming more commonplace. Once available only on high-end professional cameras, today such devices are found in mobile telephones, personal digital assistants, and other portable electronic devices. The image capture devices available in many portable electronic devices include an auto-focus feature. Auto-focus systems use image-processing circuits to automatically determine the proper focus, thereby eliminating the need for the user to do so.

One drawback with such auto-focus mechanisms is that they can be relatively slow. For instance, in some image capture systems integrated into electronic devices (e.g. portable electronic devices such as mobile phones, or stationary electronic devices such as a monitoring camera connected to a network), the auto-focus system must, through intelligent trial and error, move the lens to a particular position that corresponds to a focused image. The auto-focus system does this by examining an image, moving the lens, capturing another image, and examining it again to determine if the proper focus has been achieved. The process is repeated until the optimal lens position is found. The time can be greatly extended if the image capture device is moving when the auto-focus operation is taking place. For instance, a user's shaky hand or a moving platform can cause the image capture device to move significantly. Such movement can result in blurry images, as the autofocus feature lacks a consistent subject upon which to achieve focus. Further, even where focus is finally achieved, such movement causes the auto-focus operation to take even more time to complete.

U.S. Pat. No. 8,274,596 (Motorola Mobility LLC) relates to a method and image capture device for determining whether an image incident upon an image sensor is sufficiently stable prior to executing an auto-focus (AF) process. Whether the image is stable or not can be determined e.g. by hardware such as a gyro or accelerometer. Even if the disclosure in this document may solve the issue of blurry images, since the AF process is not performed unless the image is stable, it does not increase the speed of the AF process. On the contrary, when the camera is moving, the AF process is delayed.

SUMMARY OF THE INVENTION

In view of the above, an objective of the invention is to solve or at least reduce one or several of the drawbacks discussed above. Generally, the above objective is achieved by the attached independent patent claims.

According to a first aspect, the present invention is realized by an auto focus method for setting a focus of a camera comprising a rolling shutter image sensor and a focus lens arrangement, the auto focus method comprising the steps of:

capturing one or more image frames by the rolling shutter image sensor, wherein the rolling shutter image sensor comprises a plurality of pixel regions, wherein the rolling shutter image sensor during capture of an image frame reads out pixel data from one pixel region at a time, continuously measuring a camera motion level of the camera during the read-out of pixel data, for producing motion data associated with the pixel data and indicating a plurality of camera motion levels measured during read-out of pixel data from the plurality of pixel regions, setting the focus of the camera using an auto focus algorithm, the auto focus algorithm dividing each of the one or more image frames into a plurality of focus windows, wherein each focus window comprises pixel data of one or more of the plurality of pixel regions.

Furthermore, the auto focus algorithm comprises, for each focus window of the plurality of focus windows:

calculating a focus measure for the focus window based on the pixel data comprised in the focus window, calculating a level of motion for the focus window based on the motion data associated with the pixel data comprised in the focus window, and calculating a weighted focus measure for the focus window by weighting the focus measure for the focus window by at least the level of motion for the focus window.

A rolling shutter image sensor is a sensor which does not capture an image of a scene at a single instance in time but instead scans across the scene, normally either vertically or horizontally, and thus read outs pixel data at different instants of time. In other words, not all parts of the image of the scene are recorded at exactly the same instant. Thus, by the term "pixel region" should, in the context of present specification, be understood for example a row of pixels or a column of pixels of the rolling shutter image sensor. A pixel region may also comprise a plurality of rows or columns of the rolling shutter image sensor. During such read out of pixel data, a camera motion level of the camera is continuously measured. The camera motion level may for example be measured for each pixel region of the rolling shutter image sensor or be measured for every other pixel region etc. However, the camera motion level will be measured on at least two occasions during the read out of pixel data from the plurality of pixel regions such that one pixel region may be associated with a motion data (indicating the measured camera motion level) different from a motion data associated with another pixel region.

The inventors have realized that such differing motion data associated with separate pixel regions may advantageously be used when setting the focus of the camera using an auto focus (AF) algorithm. The auto focus algorithm divides each of the one or more image frames into a plurality of focus windows, such that each focus window comprises pixel data of one or more of the plurality of pixel regions. This means that a first focus window for an image frame may comprise pixel data which was read out during a movement of the camera (and thus the rolling shutter image sensor) while another focus window for the same image frame comprises pixel data which was read out while the camera was completely still (or moving less or more). By taking the movement(s) of the camera into account when calculating a focus measure for a focus window, a significance of a focus measure for a focus window which comprises pixel data which were read out during movement of the camera may be reduced compared to an importance of a focus measure for a focus window which comprises pixel data which were read out during less or zero movement of the camera.

The weighting of the focus measure is performed by calculating a level of motion for each focus window. The level of motion may for example be the maximum movement of the camera (indicated by the motion data) associated with pixel data in the focus window, or it may be the mean movement of the camera (indicated by the motion data) associated with pixel data in the focus window. Other ways of calculating the level of motion for the focus window may be employed.

The level of motion for a certain focus window is then used when calculating the significance of the focus measure for the focus window. In other words, a weighted focus measure for the focus window is calculated by weighting the focus measure for the focus window by at least the level of motion for the focus window.

The present invention thus provides an improved autofocus algorithm since focus measures originating from pixel data which were read out during movement of the camera may be weighted differently than focus measures originating from pixel data which were read out during less movement of the camera. This in turn makes it possible to still use image frames wherein parts of the pixel data is read out during e.g. a substantial movement of the camera in case other parts of the pixel data is read out during e.g. non substantial movement of the camera. Consequently, the speed of the AF algorithm may be increased since AF may be performed even if the camera moves during read out of pixel data. Furthermore, the auto focus algorithm of the present invention may provide a more accurate result since focus measures originating from pixel data which were read out during movements of the camera may be down weighted as described above.

According to some embodiments, the step of capturing one or more image frames comprises capturing only one image frame and the step of calculating a focus measure comprises calculating a phase-based focus measure from the pixel data comprised in the focus window. According to this embodiment, the step of calculating a weighted focus measure comprises weighting the focus measure such that a focus measure of a focus window with a high level of motion will be weighted with a lower weight than a focus measure of a focus window with a low level of motion.

Phase detection is achieved by dividing incoming light into pairs of images and comparing them. Phase detection autofocus sensors compare two offset images (derived from the only one image frame) of the subject and calculate the phase difference, or separation error, between them. If the images do not line up (i.e. the separation error is not zero), the subject is not in focus. The separation error between the images is used for deciding by how much the focus should be changed, while the relative positions of the two images is used for deciding whether the new focus needs to be nearer or further away compared to a present focus setting. For a camera with a rolling shutter image sensor, each focus window may result in a different separation error, since the camera may move differently during read out of the pixel data comprised in the focus window. By weighting the focus measure such that a focus measure of a focus window with a high level of motion will be weighted with a lower weight than a focus measure of a focus window with a low level of motion, an improved auto focus algorithm may be achieved since a focus measure (derived from the separation error) for pixel data which were read out during movement of the camera is less correct than a focus measure for pixel data which were read out during a lower movement of the camera.

According to some embodiments, the step of setting the focus of the camera comprises calculating an average value of the weighted focus measure of each of the plurality of focus windows of the only one image frame. This embodiment may result in a low computational complexity for setting the focus of the camera.

According to some embodiments, the step of capturing one or more image frames comprises capturing a plurality of image frames, each image frame captured by the camera using a different focus setting of the focus lens arrangement. According to this embodiment, the auto focus algorithm divides each of the plurality of image frames into a plurality of focus windows. Each image frame of the plurality of image frames will thus be divided into a plurality of focus windows, and consequently a focus window of e.g. a first image frame will correspond to a focus window in each of the remaining image frames. A contrast-based focus measure may then be used for calculating a focus measure for each focus window. The step of calculating a weighted focus measure may comprise calculating a fusion level of motion using the level of motion of the focus window and the level of motion of the corresponding focus window in each of remaining image frames of the plurality of the image frames and weighting the focus measure by the fusion motion level of motion such that a focus measure of a focus window with a high fusion level of motion will be weighted with lower weight than a focus measure of a focus window with a low fusion level of motion.

By the term "fusion level of motion" should, in the context of present specification, be understood that a plurality of level of motions (one for each of the corresponding focus windows among the plurality of image frames) are combined in order to calculate the fusion level of motion. According to some embodiments, said plurality of level of motions is summed to form the fusion level of motion. According to other embodiments, a maximum, mean or median value among said plurality of level of motions is used as the fusion level of motion. In other words, for each focus window, a plurality of (possibly different) levels of motion, measured at different points in time, are combined to form the fusion level of motion for a specific focus window A contrast based focus algorithm may be achieved by measuring contrast within a sensor field or focus window, through the lens. The intensity difference, or focus measure, between e.g. adjacent pixels or nearby pixels of the pixel data comprised in a focus window increases with correct image focus. By capturing a plurality of image frames using different focus and comparing the focus measure between corresponding focus windows in the plurality of image frames, a correct focus of the camera may be set. The present embodiment may advantageously down weight the importance of the focus measure for a set of corresponding focus windows wherein at least one of the focus windows comprise pixel data which were captured while the camera was moving.

For example, if a hill-climb algorithm is used, the comparison between the focus window of a first image frame and the corresponding focus window of a second image frame may be down weighted if the camera moved during capture of the pixels data comprised in either of the two focus windows, since the comparison between the two focus measures may give an erroneous result.

According to some embodiments, the calculating of a fusion level of motion comprises calculating a sum of the level of motion of the focus window and the level of motion of the corresponding focus window in each of a remaining image frames of the plurality of the image frames. This may be advantageous in the case when movements of the camera effects the calculated focus measure in more than one focus window of a set of corresponding focus windows, which may affect the correctness of a comparison between the focus measure of the set more than if only one of the focus windows in the set comprises pixel data which were read out during movement of the camera.

According to some embodiments, the calculating of a fusion level of motion comprises calculating a max level motion of the level of motion of the focus window and the level of motion of the corresponding focus window in each of the remaining image frames of the plurality of the image frames. This embodiment may reduce the computational complexity for calculating the fusion level of motion.

According to some embodiments, the camera motion level is measured for each read-out of each pixel region of the image sensor, such that the motion data associated with the pixel data comprises a separate camera motion level for each read-out of each pixel region. This may improve the correctness of the auto focus algorithm.

According to some embodiments, when the camera motion level is below a predetermined camera motion level, the motion data is set to a first value, and when the camera motion level is on or above the predetermined camera motion level, the motion data is set to a second value. For example, all camera motion levels (i.e. camera movements) below the predetermined camera motion level may be interpreted as not affecting a calculated focus measure, and consequently the camera movement can be neglected. This may reduce the computational complexity of the auto focus algorithm and also increase the speed of the algorithm.

According to some embodiments, the second value of the motion data results in that the focus measure for a focus window comprising pixel data associated with the motion data is weighted by a weight of zero. This means that as soon as any pixel data comprised in the focus window has been read out while the camera has moved more than the predetermined camera motion level, the focus measure of this focus window will be completely neglected when setting the focus of the camera. In case the contrast-based focus measure is employed, this means that weights for the focus measure for all the focus windows in a set of corresponding focus windows (one for each of the plurality of image frames as described above) will be zero and thus completely neglected when setting the focus of the camera.

According to some embodiments, when the camera motion level is below a first predetermined camera motion level, the motion data is set to a first value, when the camera motion level is above a second predetermined camera motion level, the motion data is set to a second value, and when the camera motion level is between the first and second predetermined camera motion level, the motion data is set to a further value between the first and the second value, wherein the further value is related to the camera motion level. For example, in case the motion data may be represented by numbers from zero to one where zero represent no motion of the camera and one represent maximum motion of the camera, the present embodiment may be implemented as follows. If the camera motion level is below the first predetermined camera motion level, the motion data may be set to zero (i.e. no motion), and if the camera motion level is above the second predetermined camera motion level, the motion data may be set to one (i.e. maximum motion) and in between the first and second predetermined camera motion level, the motion data may be set to a number between zero and one depending on the camera motion level. The translation between the camera motion level and the motion data may thus be similar to a sigmoid function.

This may reduce the computational complexity of the auto focus algorithm and also increase the speed of the algorithm since the camera motion level is thresholded to constant motion data values above and below certain predetermined camera motion levels.

In a similar way, when a contrast-based focus measure is employed, according to some embodiments, when the fusion level of motion is below a first predetermined level of motion, the step of weighting the focus measure by the fusion level of motion comprises weighting the focus measure with a first weight. According to this embodiment, when the fusion level of motion is above a second predetermined level of motion, the step of weighting the focus measure by the fusion level of motion comprises weighting the focus measure with a second weight. Moreover, according to this embodiment, when the fusion level of motion is between the first and second predetermined level of motion, the step of weighting the focus measure by the fusion level of motion comprises weighting the focus measure with a further weight between the first and the second weight, wherein the further weight is related to the fusion level of motion. This embodiment may generally have the same features and advantages as the above described embodiment relating to the thresholding of the motion data.

According to some embodiments, continuously measuring the camera motion level comprises the step of receiving input from a motion sensor of the camera, the input pertaining to camera motion sensed by the motion sensor. The motion sensor may be any suitable type of motion sensor such as vibration sensor, gyroscope, accelerometer, infrared sensor etc. Such a sensor may already be present on the camera and may thus be employed for this reason also. Alternatively or additionally, according to some embodiments, the continuously measuring the camera motion level comprises the step of: receiving input from a pan/tilt, PT, motor of the camera, the input pertaining to camera motion induced by the PT motor. This may be advantageous in that such input may be received before the actual movement of the camera and the algorithm may thus take advantage of knowing that the camera will move.

In a third aspect, the present invention provides a computer program product comprising a computer-readable storage medium with instructions adapted to carry out at least parts of the method of the first aspect when executed by a device having processing capability. According to some embodiments, the computer program product comprises a computer-readable storage medium with instructions adapted to carry out the entire method of the first aspect. According to other embodiments, the computer program product comprises a computer-readable storage medium with instructions adapted to carry the steps of the method of the first aspect relating to the auto focus algorithm.

In a third aspect, the present invention provides a device for setting a focus of a camera comprising a rolling shutter image sensor and a focus lens arrangement, the device being arranged to:

receive pixel data relating to one or more image frames captured by the rolling shutter image sensor, wherein the rolling shutter image sensor comprises a plurality of pixel regions, wherein the rolling shutter image sensor during capture of an image frame reads out pixel data from one pixel region at a time, receive motion data associated with the pixel data and indicating a plurality of camera motion levels measured during read-out of pixel data from the plurality of pixel regions, wherein the camera motion level of the camera is continuously measured during the read-out of pixel data, set the focus of the camera using an auto focus algorithm, the auto focus algorithm dividing each of the one or more image frames into a plurality of focus windows, wherein each focus window comprises pixel data of one or more of the plurality of pixel regions, wherein the auto focus algorithm comprises, for each focus window of the plurality of focus windows, calculating a focus measure for the focus window based on the pixel data comprised in the focus window, calculating a level of motion for the focus window based on the motion data associated with the pixel data comprised in the focus window, calculating a weighted focus measure for the focus window by weighting the focus measure for the focus window by at least the level of motion for the focus window.

Such a device may be implemented in the camera or be a separate device from the camera and wired or wireless coupled to the camera.

The second and third aspect may generally have the same features and advantages as the first aspect.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF EMBODIMENTS

In a camera with rolling shutter image sensor, since the lines (rows or columns) of pixels are read at slightly different time, some of the readouts may be affected by vibrations (felt by e.g. a gyro or accelerometer, or by means of PT signal) and some not. This is described in FIG. 1. In the illustrative example of FIG. 1, the rolling shutter image sensor comprises four pixel regions. During capture of the scene in front of the camera, the rolling shutter image sensor read outs four sets of pixel data 106a-d. In other words, the pixel data of the image frame 100 comprises four rows 106a-d of pixels 104. Since vibrations and/or other movements of the camera is continuously measured, each pixel 104 may be associated with a camera motion level 102 (represented by arrows in FIG. 1, wherein the length of the arrow represent the amount of motion, and the direction of the arrow schematically represent the direction of the movement). It should be noted that the camera motion level 102 may be measured for each pixel region or for every other pixel region or any other number of times during read out of pixel data which the image frame 100 comprises. The measured motion levels are used for producing motion data associated with the pixel data.

According to some embodiments, the motion data may be a direct digital representation of the measured motion level.

Figure 2A:
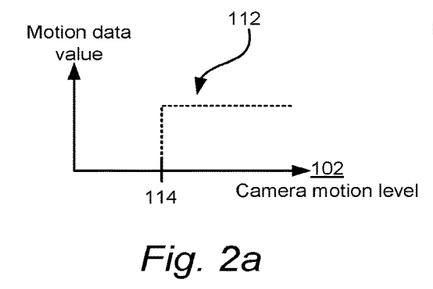
FIGS. 2a-b show examples of mapping functions between a measured camera motion level and the resulting motion data

According to other embodiments, the motion data may represent a mapped digital representation of the measured motion level. Such mappings are shown in FIG. 2a-b.

For example, in FIG. 2a, when the camera motion level 102 is below a predetermined camera motion level 114, the motion data 112 may be set to a first value, and when the camera motion level 102 is on or above the predetermined camera motion level 114, the motion data 112 may be set to a second value. This embodiment may e.g. be used for omitting parts of the pixel data 104 of the image frame 100 (in case the camera motion level 102 is on or above the predetermined camera motion level 114) from later use in an auto focus algorithm, while the parts of the pixel data 104 associated with a camera motion level 102 which is below the predetermined camera motion level 114 can be unaffected when later used in the auto focus algorithm.

Figure 2B:
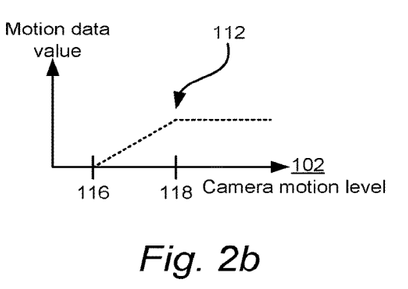

A further mapping function is shown in FIG. 2b wherein when the camera motion level 102 is below a first predetermined camera motion level 116, the motion data 112 is set to a first value. When the camera motion 102 level is above a second predetermined camera motion level 118, the motion data 112 is set to a second value, and when the camera motion level is between the first 116 and second 118 predetermined camera motion level, the motion data 112 is set to a further value between the first and the second value, wherein the further value is related to the camera motion level 102. Similar to the embodiment shown in FIG. 2a, this embodiment may achieve omitting of a part of the pixel data (associated with a camera motion level 102 which is on or above the second predetermined camera motion level 118) and leave another part of the pixel data (associated with a camera motion level 102 which is below the first predetermined camera motion level 116) unaffected when later used in the auto focus algorithm. But contrary to the embodiment in FIG. 2a, the importance of the pixel data associated with camera motion levels 102 between the first 116 and the second 118 predetermined camera motion level may be varied in accordance with the amount of movement of the camera during read-out of said pixel data when later used in the auto focus algorithm.

Figure 1:
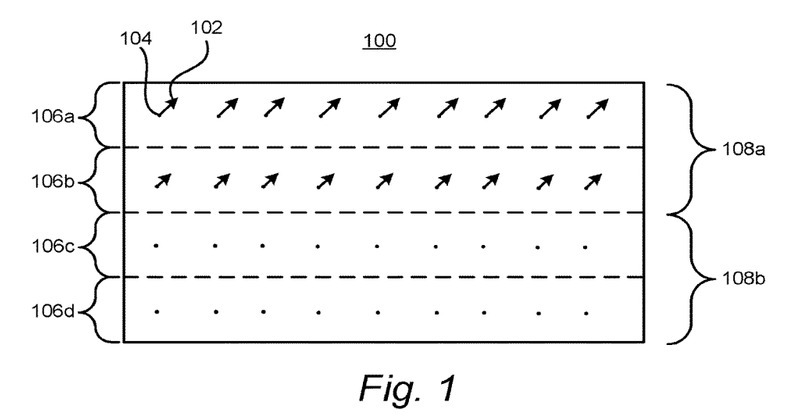
FIG. 1 shows an image frame captured by a rolling shutter image sensor wherein pixel data read out by the rolling shutter image sensor are associated with motion data.

For the purpose of auto focus, the image frame is divided into a plurality of focus windows 108a-b. In FIG. 1, each focus window 108a-b comprises two rows of pixels, e.g. the upper focus window 108a comprises the two upper rows 106a-b of pixels. According to other embodiments, each focus window may comprise one, three, five or any other suitable number of rows of pixels. Moreover, a focus window may according to some embodiments not comprise entire rows but instead each image frame 100 may be divided into focus windows in both a horizontal direction and in a vertical direction.

The motion data is used for calculating a level of motion for each focus window 108a-b. The level of motion may be calculated using an addition of all motion data associated with the pixel data comprised in a focus window. The level of motion may also be calculated based on the largest value of any motion data associated with the pixel data comprised in a focus window or the mean value of the all motion data associated with the pixel data comprised in a focus window. Any other suitable way of calculating a level of motion for a focus window may be used.

The level of motion for a focus window may then be used for calculating a weighted focus measure for the focus window by weighting a focus measure for the focus window by at least the level of motion for the focus window. The focus measure for the focus window is calculated based on the pixel data comprised in the focus window. The calculation of a focus measure from pixel data is a well known procedure and will thus only be briefly described in this document.

Figure 3:
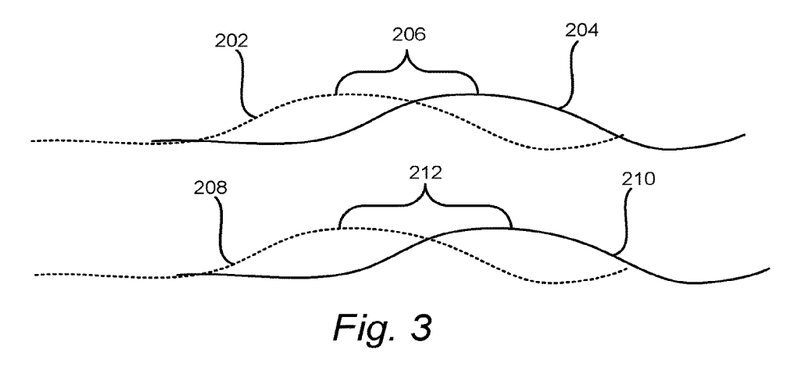
FIG. 3 shows a plot of phase-based focus measures for the image frame of FIG. 1.

FIG. 3 illustrates a plot of phase-based focus measures for the image frame of FIG. 1. In this case only one image frame is needed for the auto focus algorithm. The upper plot relates to the upper focus window 108a and the lower plot relates to the lower focus window 108b. In brief, the dotted curve 202 is a focus plot for a first offset image derived from the pixel data of the focus window 108a, and the solid curve 204 is a focus plot for a second offset image derived from the pixel data of the focus window 108a. The distance 206 between the maxima of the two curves 202, 204 correspond to the difference in phase (or separation error). A focus measure for the focus window 108a is derived using the distance 206. The lower plot shows a focus measure for the focus window 108b in a similar way, wherein a distance 212 between the maxima of two curves 208, 210 correspond to a difference in phase, or separation error. A focus measure for the focus window 108b is derived from the distance 212.

The distance 206 describes a separation error of 20 pixels, while the distance 212 describes a separation error of 25 pixels. It may be noted that the numbers 20 and 25 are only to be seen as examples which are used purely in order to simplify the explanation of the general principles. Different numerical values could be used, and the separation error could also be expressed in other terms, such as in degrees of a phase difference. In case no weighting of the two separation errors would be applied, the auto focus algorithm may result in that the focus of the camera is set based on a separation error of 22.5 pixels (average value of 20+25). The separation error is calculated in order to find if the object is in front focus or back focus position. The separation error is converted into a focus measure (focus distance, focus error etc.) which is used as an estimate of the required amount of change of the camera focus (e.g. by focus ring movement). However, as evident from FIG. 1, the pixel data 106a-b comprised in the upper focus window 108a were read out during movement of the camera while the pixel data 106c-d comprised in the lower focus window 108b were read out during no movement of the camera. Since the present invention relates to weighting focus measures based on at least the level of motion for the focus window, the focus measure for the upper focus window 108a may be considered less important than the focus measure for the lower focus window 108b when the focus of the camera is set.

For example, the camera motion level measured during read out of pixel data comprised in the upper focus window may be above the predetermined camera motion level as described in conjunction with FIG. 2a. In this case, if the mapping function described in conjunction with FIG. 2a is employed, and the second value of the motion data 112 results in that the focus measure for the focus window 108a is weighted by a weight of zero, the focus measure from the upper focus window 108a may be completely ignored when setting the focus of the camera. This in turn means that only the focus measure from the lower focus window 108b will be employed and thus result in that the focus of the camera may be set based on a separation error of 25 pixels.

According to another example, the focus measure from the upper focus window 108a is weighted with the weight 0.2 while the focus measure from the lower focus window 108b is weighted with the weight 0.8. In this case the focus of the camera may be set based on a separation error of 24 pixels (20*0.2+25*0.8). In other words, the focus of the camera is set based on an average value of the weighted focus measure of each of the plurality of focus windows 108a-b of the only one image frame 100.

It should be noted that weights as described in this specification may be calculated in a vast number of different ways. For example, predetermined thresholding of motion data similar to the mapping functions described in FIG. 2a-b may be employed. Furthermore, the weights may be calculated as an inverse of the motion data, e.g.

$$1/(1+\text{sum(motion data)}).$$

The weights may be normalized before multiplied with the focus measure.

Figure 4:
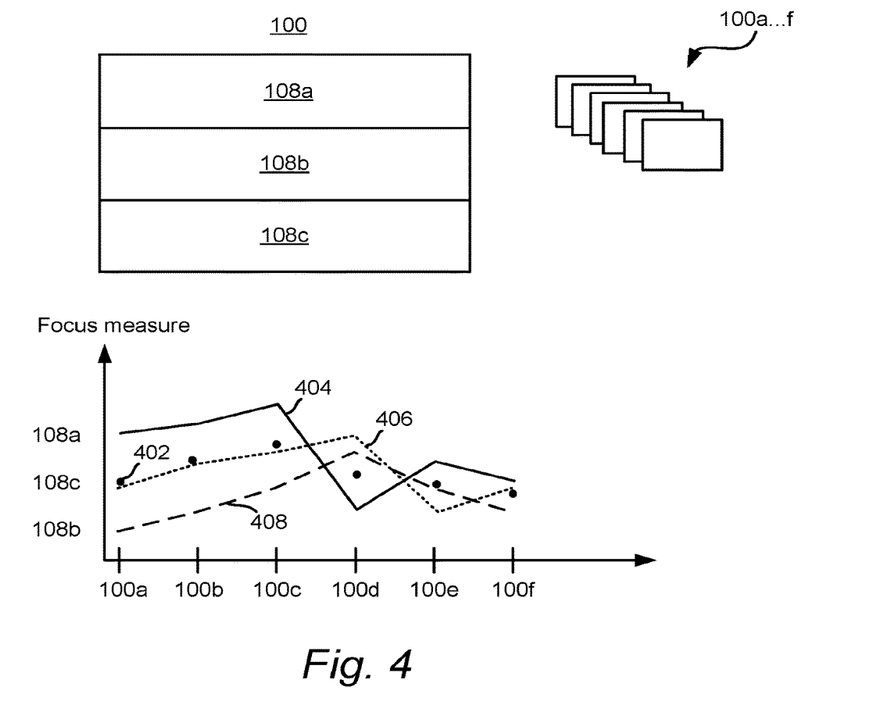
FIG. 4 illustrates how focus is set for a camera using a contrast-based focus measure according to embodiments of the invention.

FIG. 4 describe an implementation of an AF algorithm where contrast-based focus measure is employed. For this implementation, a plurality of image frames 100a-f are captured, each image frame being captured using a different focus setting of the focus lens arrangement.

The AF algorithm divides each of the plurality of image frames 100a . . . f into a plurality of focus windows 108a-c. The focus measures for the focus windows are calculated by determining the amount of contrast in the focus windows, e.g. by using a Sobel operator on the focus window pixel data. FIG. 4 illustrates how the focus measure for each focus window 108a-c varies for the different focus settings of the focus lens arrangement. In FIG. 4, the focus measure for focus window 108a is represented by the solid line 404, the focus measure for focus window 108b is represented by the dashed line 408 and the focus measure for focus window 108c is represented by the dotted line 406.

As can be seen in FIG. 4, the focus measure for the focus windows 108b-c all increase until the focus setting used for image frame 100d is reached and then decrease. However, for the focus window 108a, the focus measure plummets between image frame 100c and image frame 100d.

In case a straight average of the focus measures from the different focus windows (represented by the black dots 402) is used, the auto focus algorithm would determine that the focus setting of image 100c is the best. However, since the pixel data comprised in the focus window 108a of image frame 100d were read out during a camera motion level which affected the focus measure of this focus window greatly, the importance of the focus measure readings relating to the focus window 108a in all images 100a-f should be decreased.

This conclusion is arrived to since, for all focus measures calculated for focus window 108a, a fusion level of motion using the level of motion of the focus window 108a in each of the image frames 100a-f is calculated. In other words, the significance of the focus measures of focus window 108a in all of the plurality of image frames 100a-f should be reduced due to the high motion level of frame 100d which affects this fusion level of motion. The focus measure of the focus window 108a in the image frames 100a-f will thus be weighted with lower weight than the focus measures of the focus windows 108b-c.

For example, the weight for the focus measures of focus window 108a may be zero which means that the focus measure readings for this focus window will be omitted. Going back to FIG. 4, it is apparent that when disregarding the solid line 404 corresponding to the focus measure of focus window 108a, the focus setting used for image 100d gives the highest mean value, and, thus, the auto focus algorithm will then conclude that the focus setting of image 100d is instead the best.

It may be noted that the described fusion level of motion may also be mapped to a weight in a similar way as described in conjunction with FIGS. 2a-b and FIG. 3 above.

Instead of always capturing image frames for all possible focus settings of the focus lens arrangement of the camera, a hill-climbing algorithm may be employed. This means that as long as the focus measures (or e.g. the average focus measure) increases for the focus windows, a further focus setting is tested, but when the focus measures start to decrease, no further focus setting is tested and the focus setting giving the best result so far is used for setting the focus of the camera.

Figure 5:
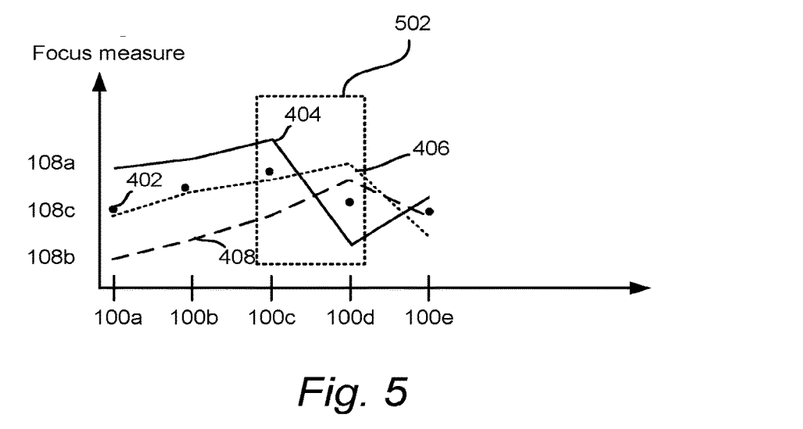
FIG. 5 illustrates how focus is set for a camera using a hill-climb algorithm for a contrast-based focus measure according to embodiments of the invention.

For this algorithm, focus measures for a present focus setting are only compared to the focus measures for the preceding focus setting. Consequently, in the context of the present invention, the auto focus method only uses two image frames at a time. Except for the use of a hill-climbing algorithm, the focus measure readings and the circumstances for the plot in FIG. 5 equals the ones in FIG. 4. As shown in FIG. 5 (inside the dashed area 502) the use of a typical auto focus algorithm (using the average values of the focus measures 402) would result in the focus setting of the focus lens arrangement used for image frame 100c being selected when setting the focus of the camera.

However, since it is assumed that, at the moment when the pixel data of the focus window 108a in image 100d are captured, the camera is moving, the focus measures of the focus window 108a for both images 100c-d should be weighted based on a high fusion level of motion which is calculated from the motion levels of image frame 100c in image frame 100d. In that way, the significance of the plummeting of the focus measure, solid line 404, for focus window 108a between image frame 100c and image frame 100d will be reduced and the hill-climbing algorithm will continue for at least one more focus setting (image frame 100e ) and then determine that the focus setting used for image frame 100d is the best.

Figure 6:
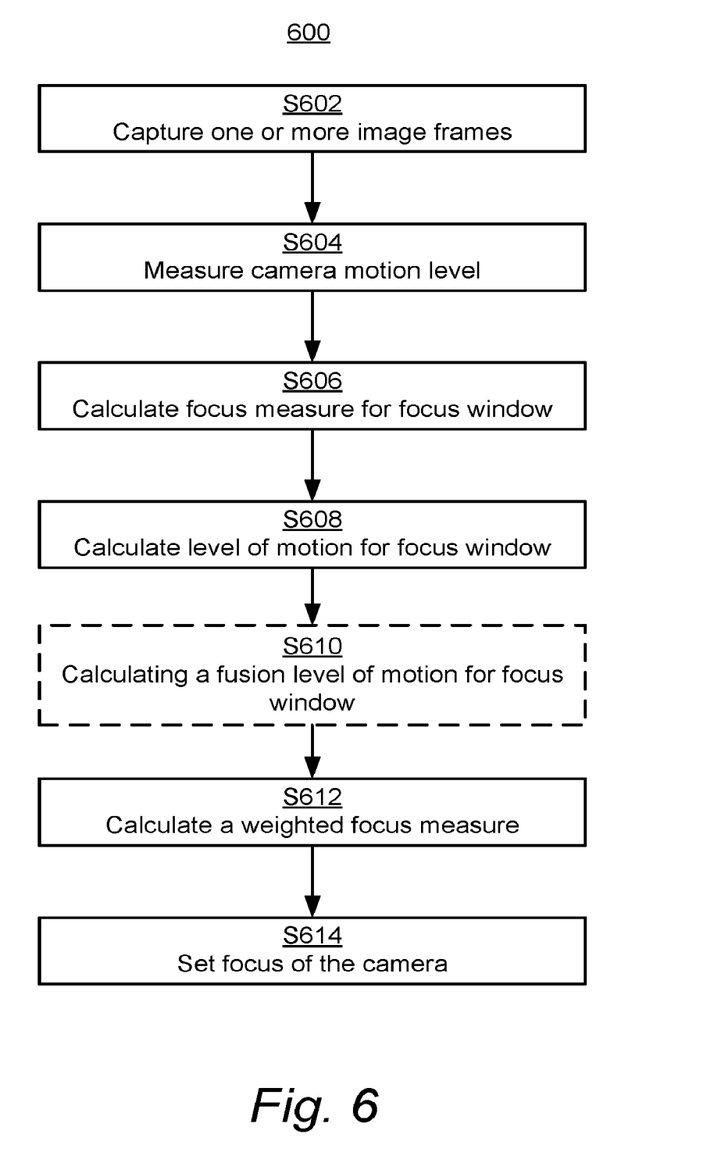
FIG. 6 shows an auto focus method for setting a focus of a camera measure according to embodiments of the invention.
Figure 7:
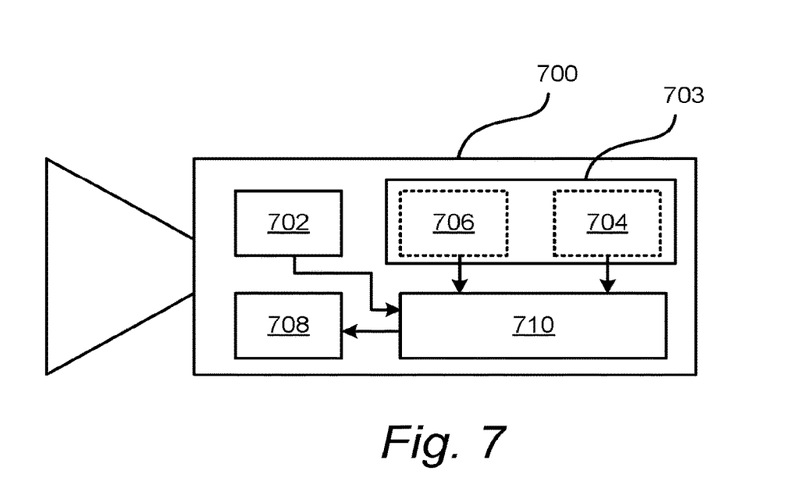
FIG. 7 shows a device for setting a focus of a camera according to embodiments of the invention.
Figure 8:
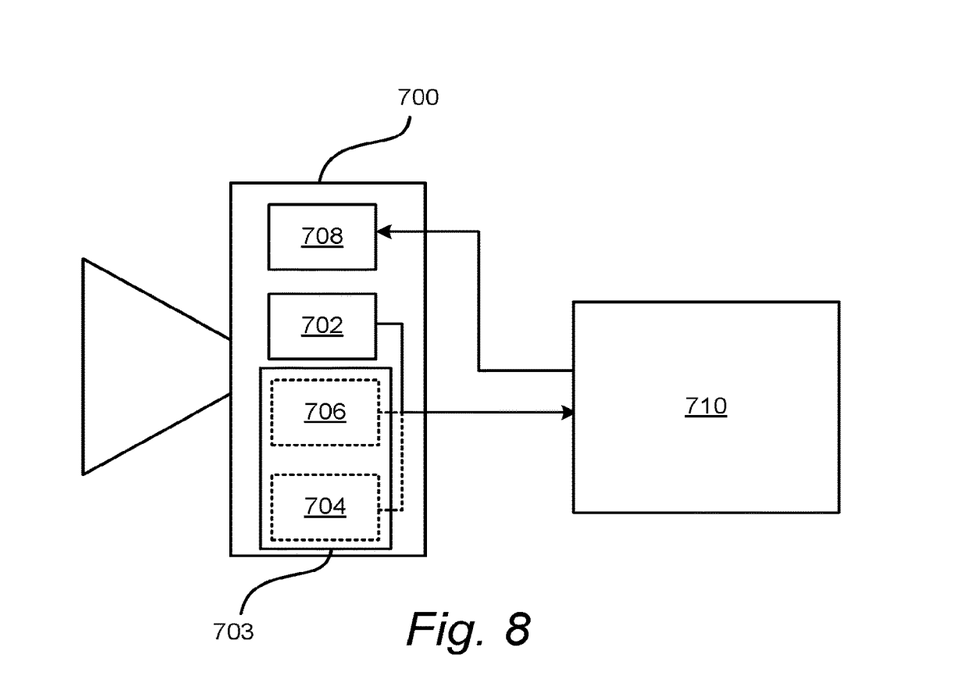
FIG. 8 shows a device for setting a focus of a camera according to other embodiments of the invention.

A device for setting a focus of a camera comprising a rolling shutter image sensor and a focus lens arrangement will now be described in conjunction with FIGS. 6-8. In FIG. 7, the device 710 is implemented inside a camera 700 while in FIG. 8, the device 710 is implemented separate from the camera 700 but in communication with the camera 700. The camera 700 comprises a rolling shutter image sensor 702 which comprises a plurality of pixel regions (e.g. rows or columns of pixels). The rolling shutter image sensor is configured to, during a capture of an image frame using the camera, read out pixel data from one pixel region at a time.

The camera also comprises a motion level measuring device 703 for continuously measuring S604 camera motion levels during the read-out of pixel data by the rolling shutter image reader 702. The motion level measuring device 703 may for example be a motion sensor 706 (vibration sensor, gyroscope, accelerometer, infrared sensor etc.). Alternatively or additionally, the motion level measuring device 703 may be receiving input from a pan/tilt, PT, motor 704 of the camera, the input pertaining to camera motion induced by the PT motor 704.

The camera 700 further comprises a focus lens arrangement 708.

The device 710 for setting a focus of the camera 700 is arranged to receive pixel data relating to one or more image frames captured S602 by the rolling shutter image sensor 702, and further to receive motion data associated with the pixel data and indicating a plurality of camera motion levels measured S604 by the motion level measuring device 703 during read-out (by the rolling shutter image sensor 702) of pixel data from the plurality of pixel regions of the rolling shutter image sensor 702. In the embodiment of FIG. 8, such data may be received by the device 710 for setting a focus of the camera 700 by any suitable communication means such as via a wire or using any wireless communication protocol such as Bluetooth, WiFi etc.

The device 710 for setting a focus of the camera 700 is arranged to set the focus of the camera (via the focus lens arrangement 708) using an auto focus algorithm implemented by the device 710. The device 710 may for example comprise a processor (e.g. an existing computer processors, or a special purpose computer processor for an appropriate system) which can execute a computer program product comprising a computer-readable storage medium with instructions adapted to carry out the auto focus algorithm.

The auto focus algorithm function comprises, as described in more detail above in conjunction with FIGS. 1-5, for each focus window of the plurality of focus windows, calculating S606 a focus measure for the focus window based on the pixel data comprised in the focus window, calculating S608 a level of motion for the focus window based on the motion data associated with the pixel data comprised in the focus window, and calculating S612 a weighted focus measure for the focus window by weighting the focus measure for the focus window by at least the level of motion for the focus window.

Optionally, in case a contrast-based auto focus algorithm is employed, the auto-focus algorithm further comprises calculating S610 a fusion level of motion using the level of motion of the focus window and the level of motion of a corresponding focus window in each of remaining image frames of the plurality of the image frames. In this case, the focus measure calculated in step S606 is weighted by the fusion motion level of motion.

Finally, the focus of the camera is set S614 using e.g. the output of the auto focus algorithm.

Although the figures may show a specific order of method steps, the order of the steps may differ from what is depicted. Also two or more steps may be performed concurrently or with partial concurrence. For example, the step of capturing S602 the one or more image frames using the rolling shutter image sensor 702 and the step of measuring S604 a camera motion level of the camera for producing motion data is preferably performed at the same time using e.g. separate processors of the camera 700 or separate threads of a single processor of the camera 700. Such variation will depend on the software and hardware systems chosen and on designer choice. All such variations are within the scope of the disclosure.

The invention claimed is:

1. An auto focus method for setting a focus of a camera comprising a rolling shutter image sensor and a focus lens arrangement, the auto focus method comprising the steps of:

capturing one or more image frames by the rolling shutter image sensor, wherein the rolling shutter image sensor comprises a plurality of pixel regions, wherein the rolling shutter image sensor during capture of an image frame reads out pixel data from one pixel region at a time, continuously measuring a camera motion level of the camera during the read-out of pixel data, for producing motion data associated with the pixel data and indicating a plurality of camera motion levels measured during read-out of pixel data from the plurality of pixel regions, wherein each pixel region of the plurality of pixel regions is associated with zero or one camera motion level, setting the focus of the camera using an auto focus algorithm, the auto focus algorithm dividing each of the one or more image frames into a plurality of focus windows, wherein each focus window comprises pixel data of one or more of the plurality of pixel regions, wherein the auto focus algorithm comprises, for each focus window of the plurality of focus windows, calculating a focus measure for the focus window based on the pixel data comprised in the focus window, calculating a level of motion for the focus window based on the motion data associated with the pixel data comprised in the focus window, calculating a weighted focus measure for the focus window by weighting the focus measure for the focus window by at least the level of motion for the focus window such that a focus measure of a focus window with a high level of motion will be weighted with a lower weight than a focus measure of a focus window with a low level of motion.

2. A method according to claim 1, wherein the step of capturing one or more image frames comprises capturing only one image frame, wherein the step of calculating a focus measure comprises calculating a phase-based focus measure from the pixel data comprised in the focus window.

3. The method according to claim 2, wherein the step of setting the focus of the camera comprises calculating an average value of the weighted focus measure of each of the plurality of focus windows of the only one image frame.

4. The method of claim 1, wherein the step of capturing one or more image frames comprises capturing a plurality of image frames, each image frame captured by the camera using a different focus setting of the focus lens arrangement, wherein the auto focus algorithm divides each of the plurality of image frames into a plurality of focus windows, wherein the step of calculating a focus measure comprises calculating a contrast-based focus measure, wherein the step of calculating a weighted focus measure comprises calculating a fusion level of motion using the level of motion of the focus window and the level of motion of a corresponding focus window in each of remaining image frames of the plurality of the image frames and weighting the focus measure by the fusion motion level of motion such that a focus measure of a focus window with a high fusion level of motion will be weighted with lower weight than a focus measure of a focus window with a low fusion level of motion.

5. The method of claim 4, wherein the calculating a fusion level of motion comprises calculating a sum of the level of motion of the focus window and the level of motion of the corresponding focus window in each of a remaining image frames of the plurality of the image frames.

6. The method of claim 4, wherein the calculating a fusion level of motion comprises calculating a max level motion of the level of motion of the focus window and the level of motion of the corresponding focus window in each of the remaining image frames of the plurality of the image frames.

7. The method of claim 1, wherein the camera motion level is measured for each read-out of each pixel region of the image sensor, such that the motion data associated with the pixel data comprises a separate camera motion level for each read-out of each pixel region.

8. The method of claim 1, further comprising the step of:

when the camera motion level is below a predetermined camera motion level, setting the motion data to a first value, and when the camera motion level is on or above the predetermined camera motion level, setting the motion data to a second value.

9. The method of claim 8, wherein the second value of the motion data results in that the focus measure for a focus window comprising pixel data associated with the motion data is weighted by a weight of zero.

10. The method of claim 1, further comprising the step of:

when the camera motion level is below a first predetermined camera motion level, setting the motion data to a first value, when the camera motion level is above a second predetermined camera motion level, setting the motion data to a second value, and when the camera motion level is between the first and second predetermined camera motion level, setting the motion data to a further value between the first and the second value, wherein the further value is related to the camera motion level.

11. The method of claim 4, wherein:

when the fusion level of motion is below a first predetermined level of motion, the step of weighting the focus measure by the fusion level of motion comprises weighting the focus measure with a first weight, when the fusion level of motion is above a second predetermined level of motion, the step of weighting the focus measure by the fusion level of motion comprises weighting the focus measure with a second weight, and when the fusion level of motion is between the first and second predetermined level of motion, the step of weighting the focus measure by the fusion level of motion comprises weighting the focus measure with a further weight between the first and the second weight, wherein the further weight is related to the fusion level of motion.

12. The method of claim 1, wherein continuously measuring the camera motion level comprises the step of:

receiving input from a motion sensor of the camera, the input pertaining to camera motion sensed by the motion sensor.

13. The method of claim 1, wherein continuously measuring the camera motion level comprises the step of:

receiving input from a pan/tilt, PT, motor of the camera, the input pertaining to camera motion induced by the PT motor.

14. A computer program product comprising a non-transitory computer-readable storage medium with instructions adapted to carry out at least parts of the method of claim 1 when executed by a device having processing capability.

15. A device for setting a focus of a camera comprising a rolling shutter image sensor and a focus lens arrangement, the device being arranged to:
- receive pixel data relating to one or more image frames captured by the rolling shutter image sensor, wherein the rolling shutter image sensor comprises a plurality of pixel regions, wherein the rolling shutter image sensor during capture of an image frame reads out pixel data from one pixel region at a time,
- receive motion data associated with the pixel data and indicating a plurality of camera motion levels measured during read-out of pixel data from the plurality of pixel regions, wherein the camera motion level of the camera is continuously measured during the read-out of pixel data, wherein each pixel region of the plurality of pixel regions is associated with zero or one camera motion level,
- set the focus of the camera using an auto focus algorithm, the auto focus algorithm dividing each of the one or more image frames into a plurality of focus windows, wherein each focus window comprises pixel data of one or more of the plurality of pixel regions,
wherein the auto focus algorithm comprises, for each focus window of the plurality of focus windows,
- calculating a focus measure for the focus window based on the pixel data comprised in the focus window,
- calculating a level of motion for the focus window based on the motion data associated with the pixel data comprised in the focus window,
- calculating a weighted focus measure for the focus window by weighting the focus measure for the focus window by at least the level of motion for the focus window such that a focus measure of a focus window with a high level of motion will be weighted with a lower weight than a focus measure of a focus window with a low level of motion.

* * * * *